United States Patent
Makley et al.

(10) Patent No.: US 8,089,762 B2
(45) Date of Patent: Jan. 3, 2012

(54) APPARATUS, SYSTEM, AND METHOD OF POWER SUPPLY DISPOSITION AND COOLING

(75) Inventors: Albert V. Makley, Morrisville, NC (US); Timothy S. Farrow, Cary, NC (US); William F. Martin-Otto, Apex, NC (US); Marc R. Pamley, Durham, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 0 days.

(21) Appl. No.: 12/729,845

(22) Filed: Mar. 23, 2010

(65) Prior Publication Data
US 2011/0235261 A1    Sep. 29, 2011

(51) Int. Cl.
H05K 7/20    (2006.01)
(52) U.S. Cl. .............. 361/695; 361/679.48; 361/379.49; 361/679.5; 361/679.51; 361/690; 454/184
(58) Field of Classification Search .................. None
See application file for complete search history.

(56) References Cited

U.S. PATENT DOCUMENTS

| | | | | |
|---|---|---|---|---|
| 5,813,243 A | * | 9/1998 | Johnson et al. | 62/259.2 |
| 6,134,107 A | * | 10/2000 | Kerrigan et al. | 361/694 |
| 7,139,170 B2 | * | 11/2006 | Chikusa et al. | 361/695 |
| 7,566,104 B2 | * | 7/2009 | Chen | 312/223.2 |
| 7,684,192 B2 | * | 3/2010 | Holmes et al. | 361/695 |
| 7,742,296 B2 | * | 6/2010 | Lai et al. | 361/679.5 |
| 7,813,124 B2 | * | 10/2010 | Karppanen | 361/679.56 |
| 7,826,215 B2 | * | 11/2010 | Glover et al. | 361/679.49 |
| 2010/0296237 A1 | * | 11/2010 | Guo | 361/679.48 |

* cited by examiner

*Primary Examiner* — Boris Chervinsky
(74) *Attorney, Agent, or Firm* — Kunzler Needham Massey & Thorpe

(57) ABSTRACT

An apparatus, system, and method are disclosed for directing power supply airflow.

A power supply is disposed adjacent a first end of a chassis. The chassis comprises a z axis from the first end to a second end of the chassis and an x axis orthogonal to the z axis. A bay is disposed adjacent the first end of the chassis along the x axis from the power supply. The bay comprises at least one storage device. A chamber is disposed adjacent the first end of the chassis adjacent the bay along the x axis between the bay and the power supply. A first baffle is disposed offset from the power supply, the bay, and the chamber along the z axis toward the second end. The first baffle forms a first section and isolates a first airflow in the first section from a second airflow.

17 Claims, 6 Drawing Sheets

APPARATUS, SYSTEM, AND METHOD OF POWER SUPPLY DISPOSITION AND COOLING

BACKGROUND

1. Field

The subject matter disclosed herein relates to power supplies and more particularly relates to power supply disposition and cooling.

2. Description of the Related Art

Electronic devices such as computers, servers, and the like employ power supplies to supply power to motherboards, peripheral devices, and fans. The placement of the power supply within the chassis of the electronic device is often restricted by the available size of the chassis and the dimensions of other devices that must be included within the chassis.

Power supplies typically generate significant heat. This heat must be removed from the power supply to function properly. Unfortunately, electronic device chassis with constricted device placement often prevent adequate airflow to the power supply in order to properly cool the power supply.

SUMMARY

Based on the foregoing discussion, the inventors have recognized a need for an apparatus, system, and method of power supply disposition and cooling. Beneficially, such an apparatus, system, and method would dispose a power supply in a small form-factor while providing adequate cooling.

The embodiments of the present invention have been developed in response to the present state of the art, and in particular, in response to the problems and needs in the art that have not yet been fully solved by currently available power supply disposition and cooling methods. Accordingly, the embodiments have been developed to provide an apparatus, system, and method for power supply disposition and cooling that overcome many or all of the above-discussed shortcomings in the art.

The apparatus for power supply disposition and cooling is provided with a power supply, a bay, a chamber, and a first baffle. The power supply is disposed adjacent a first end of a chassis. The chassis comprises a z axis from the first end to a second end of the chassis and an x axis orthogonal to the z axis.

The bay is disposed adjacent the first end of the chassis along the x axis from the power supply. The bay comprises at least one storage device. The chamber is disposed at the first end of the chassis adjacent the bay along the x axis between the bay and the power supply.

The first baffle is disposed offset from the power supply, the bay, and the chamber along the z axis toward the second end. The first baffle forms a first section and isolates a first airflow in the first section from a second airflow.

A system is also presented for power supply disposition and cooling. The system may be embodied in a tower computer. In particular, the system, in one embodiment, includes a power supply, a bay, a chamber, and components.

The power supply is disposed adjacent a bottom of a chassis. The chassis comprises a z axis from the bottom to a top of the chassis and an x axis orthogonal to the z axis. The bay is disposed adjacent the bottom of the chassis along the x axis from the power supply. The bay comprises at least one storage device.

The chamber is disposed adjacent the bottom of the chassis adjacent the bay along the x axis between the bay and the power supply. The components are disposed offset from the power supply along the z axis toward the top such that no components overlap the power supply along the z axis.

A method is presented for power supply disposition and cooling. In one embodiment, the method performs the functions of the apparatus and system. A power supply is positioned at a first end of a chassis. The chassis comprises a z axis from the first end to a second end of the chassis and an x axis orthogonal to the z axis.

The bay is positioned adjacent the first end of the chassis along the x axis from the power supply. The bay comprises at least one storage device. The chamber is positioned adjacent the first end of the chassis adjacent the bay along the x axis between the bay and the power supply.

The first baffle is positioned offset from the power supply, the bay, and the chamber along the z axis toward the second end. The first baffle forms a first section and isolates a first airflow in the first section from a second airflow.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Figure 1:
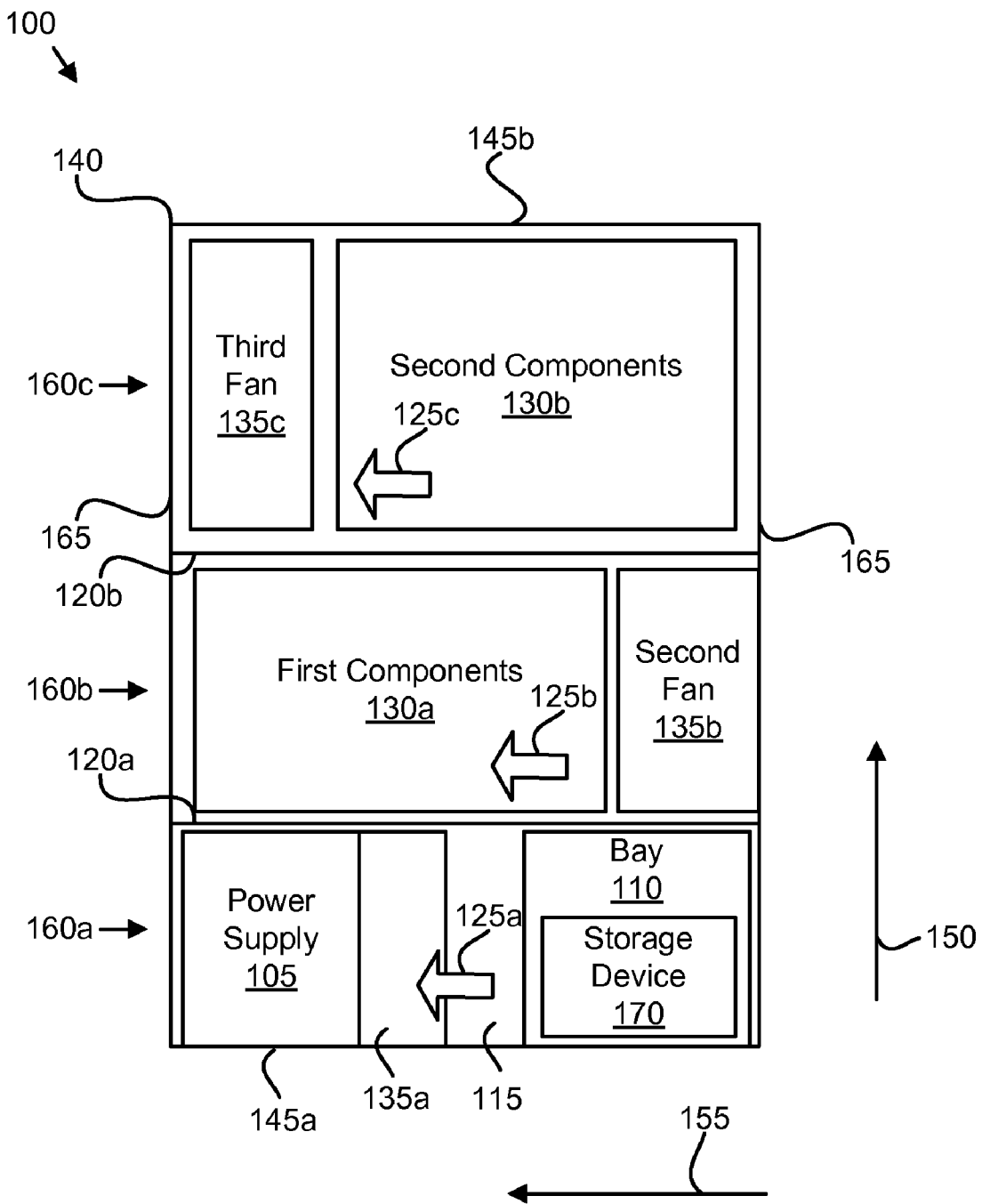
FIG. 1 is a side view schematic drawing illustrating one embodiment of a computer.

FIG. 1 is a side view schematic drawing illustrating one embodiment of a computer 100. The computer 100 may be a tower computer. The computer 100 includes a chassis 140, a power supply 105, a plurality of fans 135, a chamber 115, a bay 110, a plurality of baffles 120, and a plurality of components 130.

The chassis 140 may comprise one or more rigid materials such as plastic, aluminum, and the like. The materials of the chassis 140 may be organized as a plurality of walls enclosing an interior area. Alternatively, the materials of the chassis 140 may be organized as a framework enclosing the interior area.

In one embodiment, the chassis 140 includes a first end 145a and a second end 145b. The chassis 140 further includes a z axis 150 from the first end 145a to the second end 145b. The z axis 150 may be vertical. In addition, the chassis 140 includes an x axis 155 orthogonal to the z axis 150. The first end 145a may be a bottom. In addition, the second end 145b may be a top.

The power supply 105 may supply electrical power to a plurality of devices and components within the chassis 140. For example, the power supply 105 may supply electrical power to the fans 135, the components 130, the bay 110, and the storage device 170. In one embodiment, the power supply 105 supplies electrical power to all devices and components within the chassis 140.

The power supply 105 is disposed adjacent the first end 145a of the chassis 140. As used herein, adjacent may refer to a proximity of less than 4 centimeters (cm). In a certain embodiment, adjacent may refer to a proximity of less than 1.5 cm. The bay 110 may also be disposed adjacent the first end 145a of the chassis 140 along the x axis from the power supply 105. In one embodiment, the bay 110 comprises at least one storage device 170. The storage device 170 may be a hard disk drive, a micromechanical storage device, a holographic storage device, a semiconductor storage device, and optical storage device, or the like.

In one embodiment, the chamber 115 is also disposed adjacent the first end 145a of the chassis 140. The chamber 115 may be adjacent the bay 110 along the x axis 155 between the bay 110 and the power supply 105. In one embodiment, the power supply 105 comprises a first fan 135a. Alternatively, the first fan 135a may be a separate device from the power supply 105. The first fan 135a may be disposed of the first end 145a of the chassis 140. In addition, the first fan 135a may be disposed between the power supply 105 and the chamber 115 along the x axis. The first fan 135a may motivate a first airflow 125a along the x axis 155.

The chamber 115 may be formed by the first end 145a of the chassis 140, walls 165 of the chassis 140, the power supply 105, the bay 110, and the first baffle 120a. Alternatively, the chamber 115 may be formed by the first end 145a of the chassis 140, walls 165 of the chassis 140 the first fan 135a, the bay 110, and the first baffle 120a.

The first baffle 120a may be disposed offset from the power supply 105 the bay 110 and the chamber 115 along the z axis 150 toward the second end 145b. The first baffle 120a may form the first section 160a. The first section 160a may isolate the first airflow 125a in the first section 160a from a second airflow 125b.

In one embodiment, the chamber 115 is a volume of negative air pressure relative to an ambient air pressure outside of the chassis 140. For example, the first fan 135a may motivate the first airflow 125a from the chamber 115 and through the power supply 105, cooling the power supply 105.

In an alternate embodiment, the chamber 115 is a volume of positive air pressure relative to the ambient air pressure outside of the chassis 140. The first fan 135a may draw the first airflow 125a through the power supply 105 into the chamber 115.

The components 130 may include first components 130a and second components 130b. The second components 130b may be offset from the first components 130a along the z axis toward the second end 145b. The components 130 may be offset from the power supply 105 along the z axis 150 toward the second end 145b such that no components 130 overlap the power supply 105 along the z axis 150.

In one embodiment, a second baffle 120b is disposed between the second components 130b and the first components 130a. The first baffle 120a and the second baffle 120b may form a second section 160b comprising the first components 130a. In one embodiment, the second section 160b is formed by the walls 165 of the chassis 140, the first baffle 120a, and the second baffle 120b. The second end 145b, the walls 165 of the chassis 140, and the second baffle 120b may form a third section 160c.

A second fan 135b may be disposed in the second section 160b. The second fan 135b may motivate the second airflow 125b. In addition, a third fan 135c may be disposed in the third section 160c. The third fan 135c may motivate a third airflow 125c. The second baffle 120b may isolate the second airflow 125b of the second section 160b from the third airflow 125c of the third section 160c.

In one embodiment, the second components 130b comprise an optical disk drive. The second components 130b may also include at least a processor portion and a memory portion of a motherboard as will be described hereafter.

By isolating the first section 160a from the second section 160b, the first baffle 120a allows the first airflow 125a to be tuned to sufficiently cool the power supply 105. In addition, the first baffle 120a and the second baffle 120b isolating the second section 160b from the first section 160a and a second section 160c allows the second airflow 125b to be tuned to sufficiently cool the first components 130a. The second baffle 120b isolating the third section 160c from the second section 160b also allows the third airflow 123 to be tuned sufficiently to cool the second components 130b. In one embodiment, elements such as the power supply 105, the first components 130a, or the second components 130b are sufficiently cooled when the airflow 125 passing over the element maintains the element within an operating temperature range.

Figure 2:
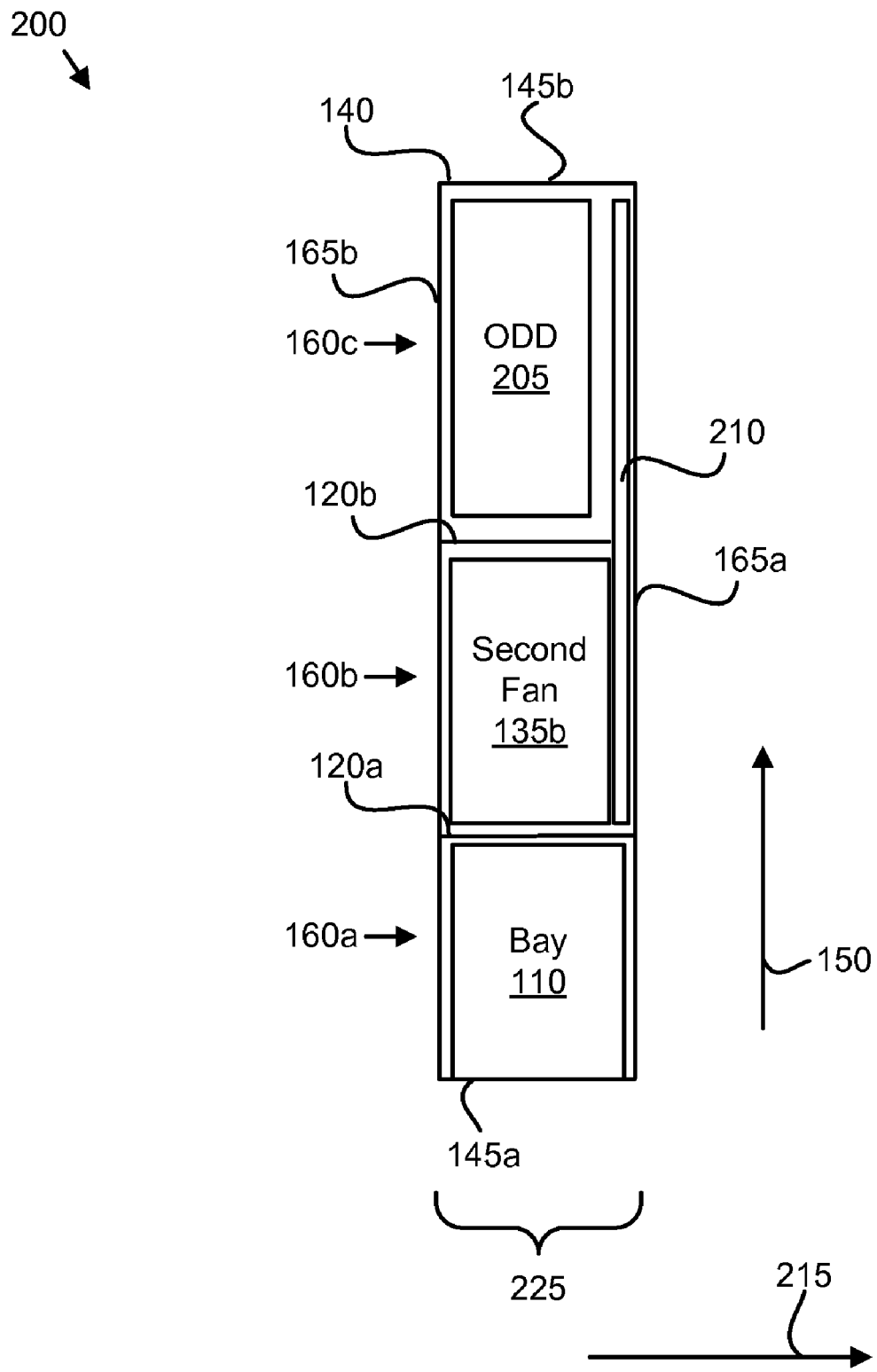
FIG. 2 is a front view schematic drawing illustrating one embodiment of a computer.

FIG. 2 is a front view schematic drawing illustrating one embodiment of a computer 200. The computer 200 may be the computer 100 of FIG. 1. The description of the computer 200 may refer to elements of FIG. 1, like numbers referring to like elements.

A y axis 215 is shown orthogonal to the z axis 150. The y axis 215 is also orthogonal to the x axis 155 (not shown). The chassis 140 may have a width 225 along the y axis 215. In one embodiment, the width 225 is in the range of 12.5 cm to 13.34 cm.

The components 130 of FIG. 1 may include a motherboard 210 and an optical disk drive 205. The motherboard 210 may be compliant with an Advanced Technology Extended (ATX) form factor. Alternatively, the motherboard 210 may comply with a Balanced Technology Extended (BTX) form factor. The optical disk drive 205 is offset from the motherboard 210 along the y axis 215. In one embodiment, the optical disk drive 205 is disposed adjacent the second end 145*b* of the chassis 140.

In one embodiment, the motherboard is disposed in both the second section 160*b* and the third section 160*c*. The motherboard 210 may be disposed parallel with a chassis wall 165 of the chassis 140 in a plane parallel a plane of the x axis 155 and z axis 150. A processor portion and a memory portion of the motherboard 210 may be disposed in the third section 160*c*.

The second baffle 120*b* may extend from a second chassis wall 165*b* towards a first chassis wall 165*a*. In one embodiment, the second baffle 120*b* does not reach the first chassis wall 165*a*. Alternatively, the second baffle 120*b* may reach the first chassis wall 165*a*.

The first baffle 120*a* may reach from the second chassis wall 165*b* to the first chassis wall 165*a*. In an alternate embodiment, the first baffle 120*a* may extend from the second chassis wall 165*b* toward the first chassis wall 165*a* without reaching the first chassis wall 165*a*.

Figure 3:
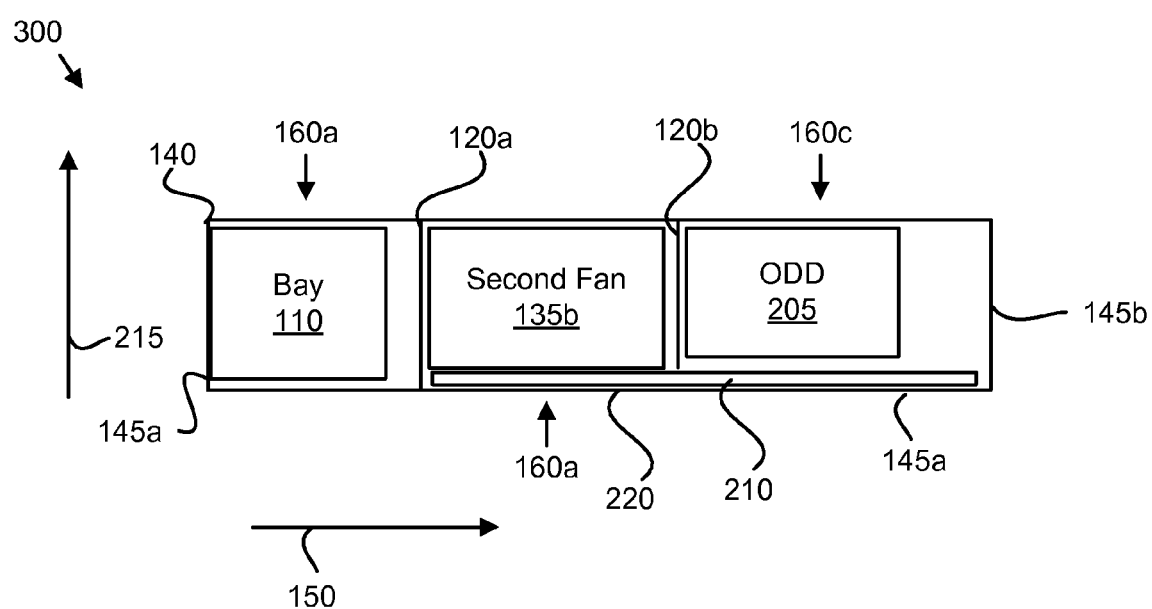
FIG. 3 is a front view schematic drawing illustrating one alternate embodiment of a computer.

FIG. 3 is a front view schematic drawing illustrating one alternate embodiment of a computer 300. The computer 300 may be the computers 100, 200 of FIGS. 1-2. The description of the computer 300 refers to elements of FIGS. 1-2, like numbers referring to like elements.

The z axis 150 of the computer 300 is horizontal, with the first end 145*a* and second end 145*b* forming walls of the chassis 140. The power supply 105 (not shown), the chamber 115 (not shown), and the bay 110 are disposed adjacent the first end 145 of the chassis 140.

The first airflow 125*a* of the first section 160*a* is isolated from the second airflow 125*b* of the second section 160*b* by the first baffle 120*a*. In addition, the second airflow 125*b* of the second section 160*b* is isolated from the third airflow 125*c* of the third section 160*c* by the second baffle 120*b*.

Figure 4:
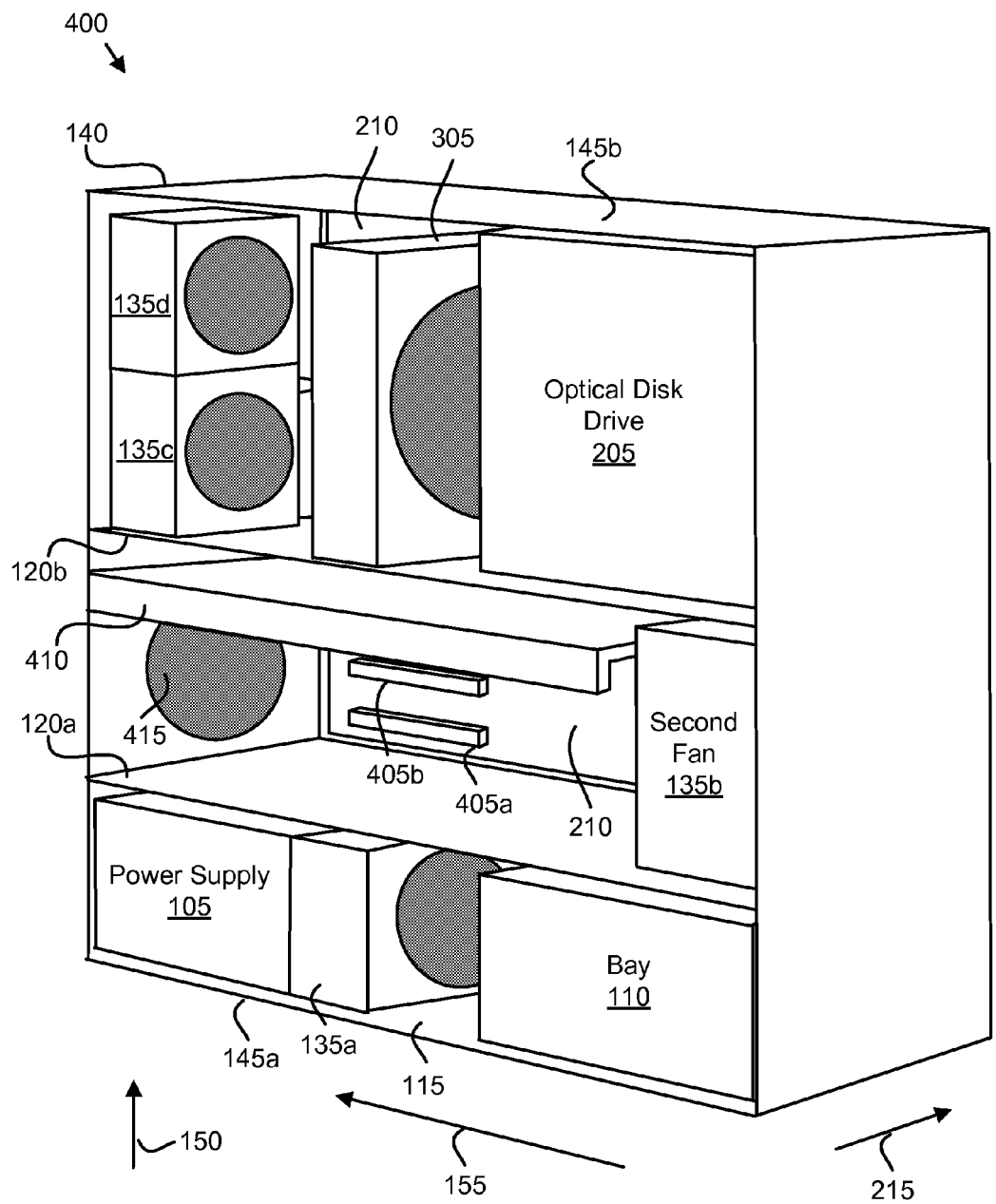
FIG. 4 is a perspective drawing illustrating one embodiment of a computer.

FIG. 4 is a perspective drawing illustrating one embodiment of a computer 400. The computer 400 may be the computers 100, 200, 300 of FIGS. 1-3. The description of the computer 400 refers to elements of FIGS. 1-3, like numbers referring to like elements.

The computer 400 may include a plurality of sockets 405. The sockets 405 may be disposed on the motherboard 210. A peripheral card 410 may connect to a socket 405. Each socket 405 may be connector. In one embodiment, each socket 405 is an edge card connector. Alternatively, each socket 405 is a pin connector.

The second fan 135*b* may motivate the second airflow 125*b* through the second section 160*b* cooling the first peripheral card 410. In one embodiment, the second airflow 125*b* is exhausted through a grate 415.

The third section 160*c* is shown with the third fan 135*c* and a fourth fan 135*d*. The third fan 135*c* and the fourth fan 135*d* may motivate the third airflow 125*c* through the third section 160*c*.

In one embodiment, the processor portion and the memory portion of the motherboard 210 are disposed in an enclosure 305. The enclosure 305 may be disposed across a cross-section of the third section 160*c* along with the x axis 155. Disposing the processor portion and a memory portion in the enclosure 305 may increase the quantity of the third airflow 125*c* available to cool the processor portion and the memory portion.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
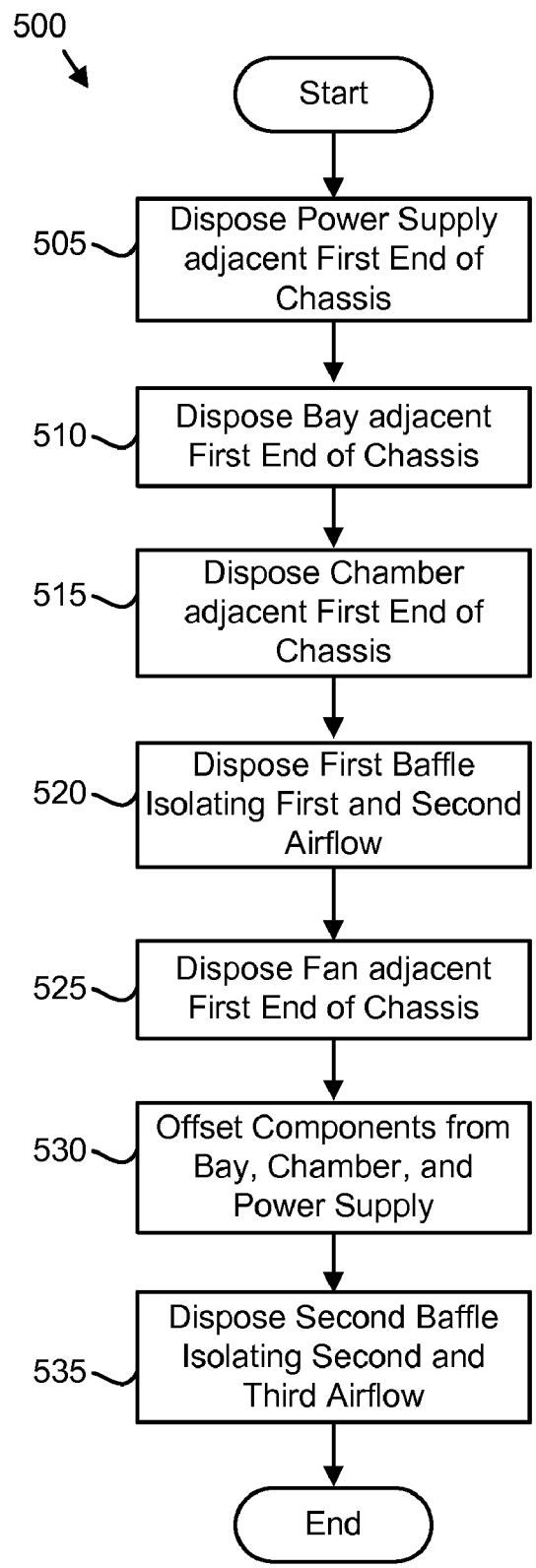
FIG. 5 is a schematic flow chart diagram illustrating one embodiment of a power supply disposition and cooling method.

FIG. 5 is a schematic flow chart diagram illustrating one embodiment of a power supply disposition and cooling method 500. The method 500 substantially includes the steps to carry out the functions presented above with respect to the operation of the described apparatus and system of FIGS. 1-4. The description of the method 500 refers to elements of FIGS. 1-4, like numbers referring to like elements.

The method 500 starts, and the power supply 105 may be disposed 505 adjacent the first end 145*a* of the chassis 140. In one embodiment, the chassis 140 may be the chassis 140 of the tower computer. The power supply 105 may be disposed 505 adjacent the bottom of the tower computer chassis 140.

The bay 110 may be disposed 510 adjacent the first end 145*a* of the chassis 140. The bay 110 may comprise at least one storage device 170. In one embodiment, the bay 110 includes a grate, louvers, orifices, and the like that allow air to pass through the bay 110 to the chamber 115. The first airflow 125*a* through the bay 110 may cool the at least one storage device 170.

In one embodiment, the chamber 115 is disposed 515 adjacent the first end 145*a* of the chassis 140. The chamber 110 may be adjacent the bay 110 along the x axis 155 between the bay 110 and the power supply 105.

The first baffle 120*a* may be disposed 520 offset from the power supply 105, the bay 110, and the chamber 115 along the z axis 150 toward the second end 145*b*. The first baffle 120*a* forms the first section 160*a* isolating the first airflow 125*a* in the first section 160*a* from the second airflow 125*b*.

The first fan 135*a* may be disposed 525 adjacent the first end 145*a* of the chassis 140. In addition, the first fan 135*a* may be disposed 525 between the power supply 105 and the chamber 115 along the x axis 155. The first fan 135*a* may motivate the first airflow 125*a* along the x axis 155.

In one embodiment, the components 130 are disposed 530 offset from the power supply 105 along the z axis 150 toward the second end 145*b*. In a certain embodiment, the components 130 are disposed 530 so that no components 130 overlap the power supply 105 along the z axis 150. In an alternate embodiment, the components 130 are disposed to overlap the power supply 105 along the z axis 150.

The components 130 may comprise first components 130a and second components 130b. The second components 130b may be offset from the first components 130a along the z axis 150 toward the second end 145b.

In one embodiment, a second baffle 120b is disposed 535 between the second components 130b and the first components 130a and the method 500 ends. The first baffle 130a and the second baffle 130b may form the second section 160b. The second section 160b may comprise the first components 130a. The second baffle 120b may form the third section 160c. The third section 160c may comprise the second components 130b. The second baffle 120b may isolate the second airflow 125b of the second section 160b from the third airflow 125c a third section 160c.

Figure 6:
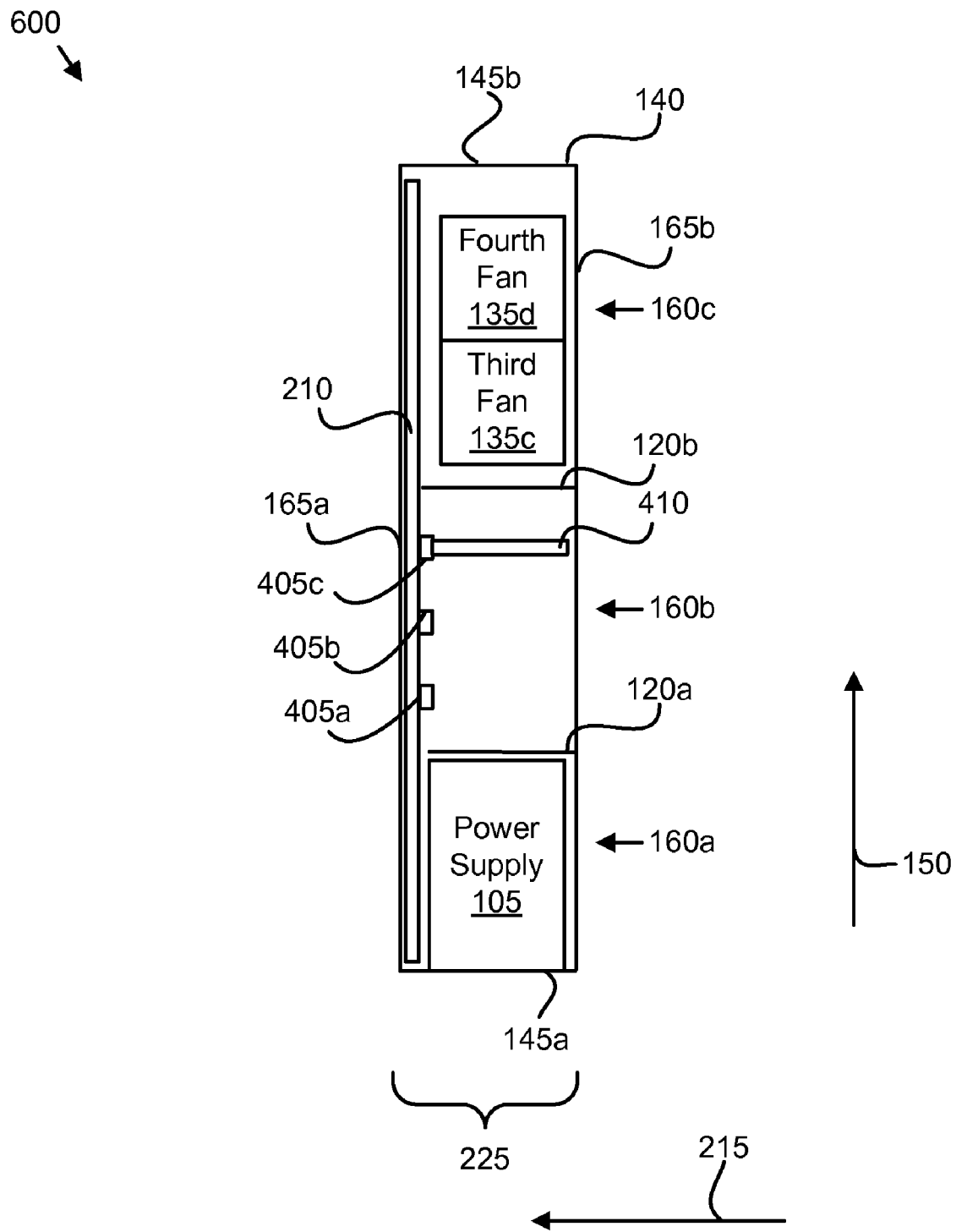
FIG. 6 is a front view schematic drawing illustrating one alternate embodiment of a computer.

FIG. 6 is a rear view schematic drawing illustrating one alternate embodiment of a computer 600. The computer 600 may be the computers 100, 200, 300, 400 with an extended motherboard 210 and a shortened first baffle 120a. The description of the computer 600 refers to elements of FIGS. 1-5, like numbers referring to like elements.

In the depicted embodiment, the motherboard 210 overlaps the power supply 105 along the z axis 150. The motherboard 210 may be compliant with an Advanced ATX form factor. Alternatively, the motherboard 210 may comply with a BTX form factor. The first baffle 120a extends from the second chassis wall 165b towards the motherboard 210.

In one embodiment, the first baffle 120a isolates the first airflow 125a from the second airflow 125b. For example, the first baffle 120a may extend sufficiently close to the motherboard 210 so that little air is exchanged between the first section 160a and the second section 160b. In one embodiment, the first baffle 120a is sufficiently close to the motherboard 210 if the distance between the first baffle 120a and the motherboard 210 is in the range of 1 millimeters (mm) to 8 mm. In a certain embodiment, the first baffle 120a is sufficiently close to the motherboard 210 if the distance between the first baffle 120a and the motherboard 210 is in the range of 1 mm to 4 mm. In one embodiment, the width 225 of the chassis 140 is sufficient to mount a full size peripheral card 410 in a socket 405.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a power supply disposed adjacent a first end of a chassis, the chassis comprising a vertical z axis from the first end to a second end of the chassis and an x axis orthogonal to the z axis;
a bay disposed adjacent the first end of the chassis along the x axis from the power supply, the bay comprising at least one storage device;
a chamber disposed adjacent the first end of the chassis adjacent the bay along the x axis between the bay and the power supply;
a first fan disposed adjacent the first end of the chassis between the power supply and the chamber along the x axis and motivating a first airflow along the x axis; and
a first baffle disposed offset from the power supply, the bay, and the chamber along the z axis toward the second end, the first baffle forming a first section isolating the first airflow in the first section from a second airflow.

2. The apparatus of claim 1, further comprising components disposed within the chassis offset from the power supply along the z axis toward the second end such that no components overlap the power supply along the z axis.

3. The apparatus of claim 2, the components comprising a motherboard disposed parallel with a chassis wall in a plane parallel a plane of the x and z axes.

4. The apparatus of claim 2, the components comprising first components and second components, the second components offset from the first components along the z axis toward the second end.

5. The apparatus of claim 4, further comprising a second baffle disposed between the second components and the first components, the first baffle and the second baffle forming a second section comprising the first components and the second baffle forming a third section comprising the second components, the second baffle isolating the second airflow of the second section from a third airflow of the third section.

6. The apparatus of claim 5, the second components comprising an optical disk drive and at least a processor portion and a memory portion of the motherboard.

7. The apparatus of claim 1, wherein a width of the chassis along a y axis orthogonal to the x and z axes is in the range of 12.5 to 13.34 centimeters.

8. The apparatus of claim 1, wherein the storage device is a hard disk drive.

9. A system comprising:
a power supply disposed adjacent a bottom of a chassis, the chassis comprising a vertical z axis from the bottom to a top of the chassis and an x axis orthogonal to the z axis;
a bay disposed adjacent the bottom of the chassis along the x axis from the power supply, the bay comprising at least one storage device;
a chamber disposed adjacent the bottom of the chassis adjacent the bay along the x axis between the bay and the power supply;
a first fan disposed adjacent the first end of the chassis between the power supply and the chamber along the x axis and motivating a first airflow along the x axis; and
components disposed within the chassis offset from the power supply along the z axis toward the top such that no components overlap the power supply along the z axis.

10. The system of claim 9, the components comprising first components and second components, the second components offset from the first components along the z axis toward the top.

11. The system of claim 10, further comprising a first baffle disposed offset from the power supply, the bay, and the chamber along the z axis toward the top, the first baffle forming a first section isolating a first airflow in the first section from a second airflow, and a second baffle disposed between the second components and the first components, the first baffle and the second baffle forming a second section comprising the first components and the second baffle forming a third section comprising the second components, the second baffle isolating the second airflow of the second section from a third airflow of the third section.

12. The system of claim 9, wherein a width of the chassis along a y axis orthogonal to the x and z axes is in the range of 12.5 to 13.34 centimeters.

13. The system of claim 9, the components comprising an Advanced Technology Extended (ATX) form factor motherboard as specified Mar. 23, 2010.

14. A method comprising:
disposing a power supply adjacent a first end of a chassis, the chassis comprising a vertical z axis from the first end to a second end of the chassis and an x axis orthogonal to the z axis;
disposing a bay adjacent the first end of the chassis along the x axis from the power supply, the bay comprising at least one storage device;
disposing a chamber adjacent the first end of the chassis adjacent the bay along the x axis between the bay and the power supply; and
disposing a first fan adjacent the first end of the chassis between the power supply and the chamber along the x axis and motivating a first airflow along the x axis with the first fan;
disposing a first baffle offset from the power supply, the bay, and the chamber along the z axis toward the second end, the first baffle forming a first section isolating the first airflow in the first section from a second airflow.

15. The method of claim 14, further comprising disposing components within the chassis offset from the power supply along the z axis toward the second end such that no components overlap the power supply along the z axis.

16. The method of claim 15, the components comprising first components and second components, the second components offset from the first components along the z axis.

17. The method of claim 16, further comprising disposing a second baffle between the second components and the first components, the first baffle and the second baffle forming a second section comprising the first components and the second baffle forming a third section comprising the second components, the second baffle isolating the second airflow of the second section from a third airflow of the third section.

* * * * *